United States Patent [19]
Yoshieda

[11] Patent Number: 4,598,468
[45] Date of Patent: Jul. 8, 1986

[54] APPARATUS FOR ASSEMBLING A PAIR OF FASTENER ELEMENTS

[75] Inventor: Keiichi Yoshieda, Kurobe, Japan

[73] Assignee: Nippon Notion Kogyo Co., Ltd., Tokyo, Japan

[21] Appl. No.: 673,727

[22] Filed: Nov. 21, 1984

[30] Foreign Application Priority Data

Nov. 22, 1983 [JP] Japan .................. 58-180593[U]

[51] Int. Cl.⁴ ............ B23P 21/00; B23Q 15/00; D05B 23/00
[52] U.S. Cl. .................... 29/716; 29/243.5; 29/DIG. 3; 112/2; 112/104; 227/7; 227/8
[58] Field of Search .......... 29/243.53, 283.5, 709, 29/714, 715, 716, DIG. 3; 112/2, 104; 227/2, 6, 7, 8; 414/677

[56] References Cited

U.S. PATENT DOCUMENTS

| | | | |
|---|---|---|---|
| 4,343,423 | 8/1982 | Sauermilch | 227/8 X |
| 4,378,900 | 4/1983 | Sauermilch | 227/8 |
| 4,384,667 | 5/1983 | Smallegan et al. | 227/2 |

FOREIGN PATENT DOCUMENTS

| | | | |
|---|---|---|---|
| 1523596 | 9/1978 | United Kingdom | 227/8 |
| 593940 | 2/1978 | U.S.S.R. | 227/8 |

Primary Examiner—Howard N. Goldberg
Assistant Examiner—Ronald S. Wallace
Attorney, Agent, or Firm—Hill, Van Santen, Steadman & Simpson

[57] ABSTRACT

An apparatus, for assembling a pair of fastener elements of a garment fastener, includes a safe-confirmation member mounted on a lower end of a vertically movable supporting rod supported by a frame in parallel relation to a punch-carrying plunger, and a drive means for moving the supporting rod vertically between an uppermost position in which the safe-confirmation member is disposed around a punch, and a lowermost position in which the safe-confirmation member is disposed around the die in the absence of the operator's finger or a tool near the die. Upon arrival of the safe-confirmation member at the lowermost position, a detecting means produces a command signal to start lowering of the punch toward the die.

4 Claims, 6 Drawing Figures

APPARATUS FOR ASSEMBLING A PAIR OF FASTENER ELEMENTS

BACKGROUND OF THE INVENTION

1. Field of the Invention:

The present invention relates to an apparatus for assembling a pair of fastener elements of a garment fastener, such as a snap fastener, a button and an ornament, with or without a garment fabric disposed between the two fastener elements.

2. Prior Art:

Various fastener-assembling apparatus are known in which a pair of fastener elements of a garment fastener is supported on a lower or die unit and an upper or punch unit, respectively; a punch of the upper unit moves toward a die of the lower unit to join the two fastener elements together inclinched condition, with or without a garment fabric sandwiched between the two fastener elements. With such known apparatus, there would be a danger that the operator's finger or a tool would be accidentally jammed between the die and punch.

If a cover or guard could be provided between the die and punch for safety, it would be difficult to achieve not only easy placement of the individual fastener elements on the die and punch, but also easy removal of the joined fastener elements therefrom, particularly when the garment fastener is to be attached to a garment fabric.

SUMMARY OF THE INVENTION

According to the present invention, a fastener-assembling apparatus includes a safe-confirmation member mounted on a lower end of a vertically movable supporting rod supported by a frame in parallel relation to a punchcarrying plunger, and a drive means for moving the supporting rod vertically between an uppermost position in which the safe-confirmation member is disposed around a punch as retracted from a die, and a lowermost position in which the safe-confirmation member is disposed around the die in the absence of any obstacle, such as the operator's finger or a tool, in the vicinity of the die. When the safe-confirmation member arrives at the lowermost position, a detecting means produces a command signal to start lowering of the punch toward the die.

It is therefore an object of the present invention to provide a fastener-assembling apparatus which is free from a danger that the operator's finger or a tool could be accidentally jammed between a die and a punch during operation without any safety cover or guard between the die and punch.

Many other advantages, features and additional objects of the present invention will become manifest to those versed in the art upon making reference to the detailed description and the accompanying drawings in which a preferred embodiment incorporating the principles of he present invention is shown by way of illustrative example.

DETAILED DESCRIPTION

Figure 1:
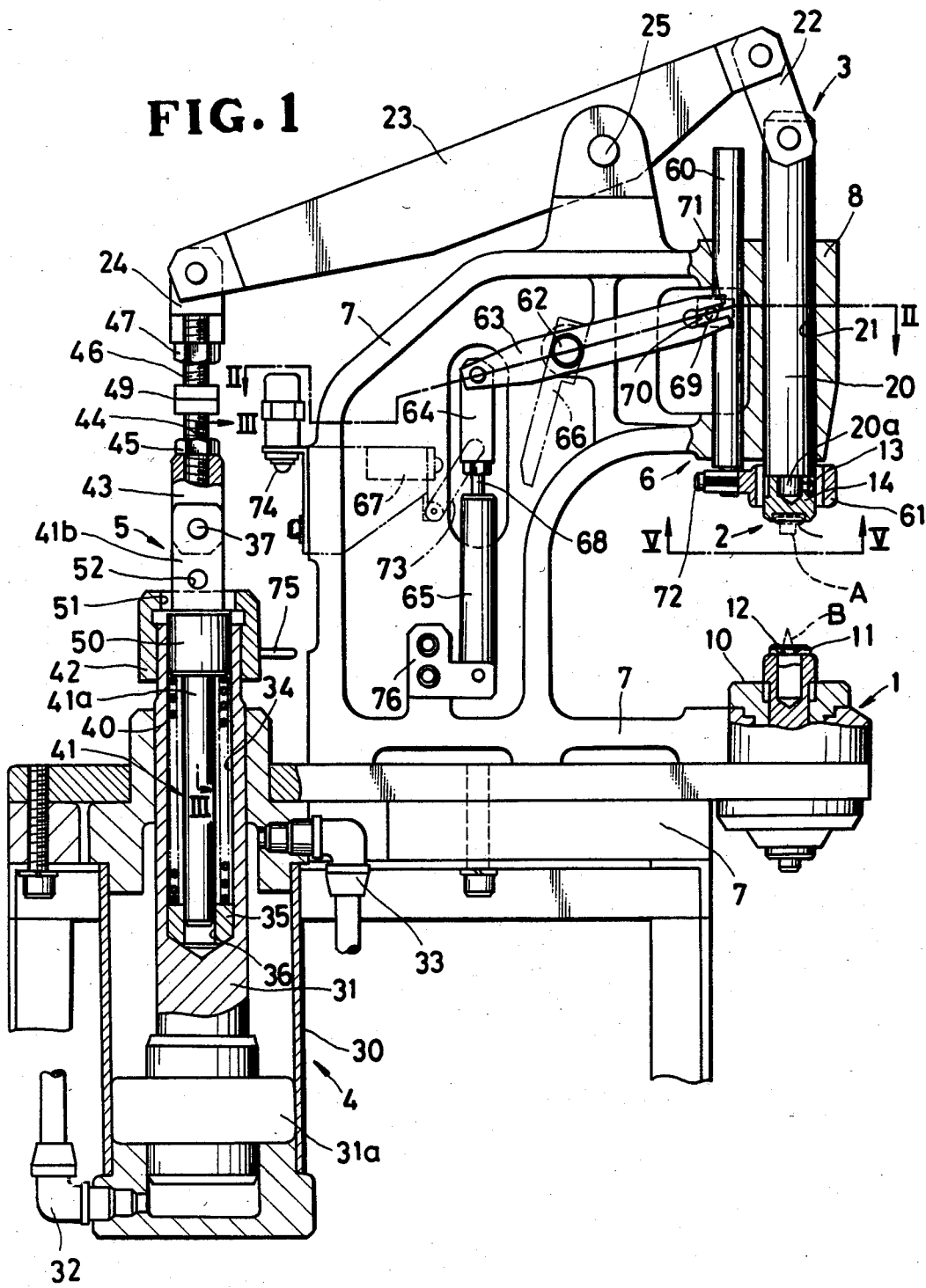
FIG. 1 is a fragmentary side elevational view, partly in cross section, of an apparatus embodying the present invention.

FIG. 1 shows an apparatus for joining a pair of first and second fastener elements A, B (illustrated in phantom lines) together, with or without a garment fabric (not shown). The apparatus generally comprises a lower or die unit 1 and an upper or punch unit 2, both supported by a frame 7 in oposite relation to each other. In the illustrated embodiment, the first and second fastener elements A, B comprise a button and a tack, respectively. The button A has a head and a shank projecting centrally therefrom, while the tack B has a head and a spike projecting centrally therefrom.

As shown in FIG. 1, the lower unit 1 includes a base 10 fixedly supported by the frame 7, and a stationary die 11 having in its upper end surface a first recess 12 for receiving the head of the second fastener element B with the spike directed upwardly.

As best shown in FIG. 1, the upper unit 2 includes a support 8 integral with the frame 7 and having a vertical bore 21, and a plunger 20 of circular cross section reciprocable within the vertical bore 21 in the support 8. At its lower end, the plunger 20 has an integral head 20a of smaller circular cross section extending coaxially with the plunger 20.

A punch 14 is secured to the plunger head 20a by means of a screw 13 and has in its lower surface a second recess 15 for receiving the head of the first fastener element A with the shank directed downwardly.

The plunger 20 is operatively connected at its upper end to an air cylinder 4 via a pair of first and second links 22, 23 and a shock-absorbing mechanism 5, for vertical reciprocating movements toward and away from the lower unit 1. The air cylinder 4 includes a cylinder 30 fixedly supported by the frame 7, and a piston rod 31 reciprocable within the cylinder 30 by the action of pressurized air that is introduced into and discharged from the cylinder 30 via a pair of nipples 32, 33.

Figure 3:
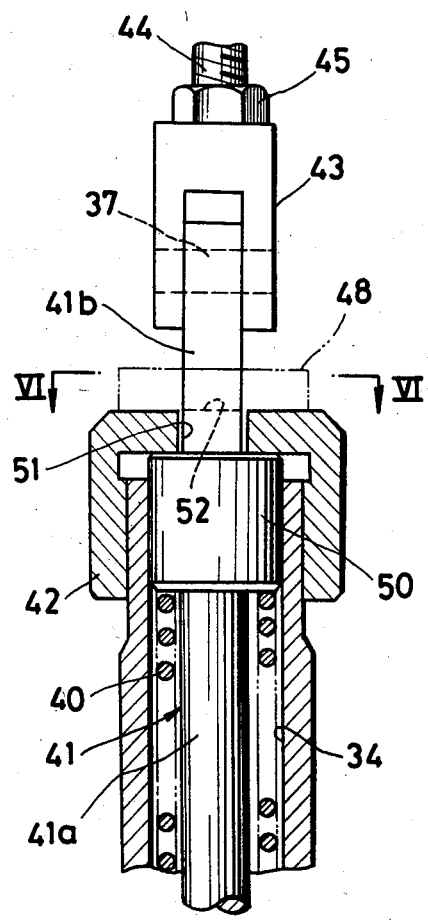
FIG. 3 is an enlarged cross-sectional view along line III—III of FIG. 1.
Figure 6:
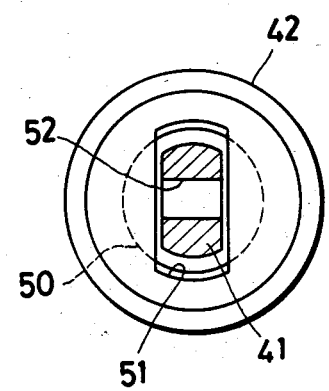
FIG. 6 is a cross-sectional view taken along line VI—VI of FIG. 3.

As shown in FIGS. 1 and 3, the piston rod 31 has an axial bore 34 extending from an upper end of the piston rod 31 and terminating short of a piston 31a. An auxiliary rod 41 is axially slidably received in the axial bore 34 of the piston rod 31 and has a central major-diameter portion 50 and a lower minor-diameter portion 41a extending downwardly from the central portion 50 into an axial hole 36 in a seat 35 fitted at the bottom of the axial bore 34, there being a compression spring 40 acting between the seat 35 and the central portion 50 to normally urge the auxiliary rod 41 upwardly. The auxiliary rod 41 also has an upper portion 41b of generally rectangular cross section extending upwardly from the central portion 50 and pivotally connected to a lower connecting piece or clevis 43 by a pin 37. The upward movement of the auxiliary rod 41 relative to the piston rod 31 is restricted by a cap 42 threadedly mounted on the upper end of the piston rod 31, the cap 42 having in its wall a generally rectangular opening 51 (FIGS. 3 and 6) through which the upper portion 41a of the auxiliary rod 41 extends.

The lower clevis 43 is connected to a similar upper clevis 24 by means of a first or a left-handedly threaded bolt 44 and a second or a right-handedly threaded bolt 46, each bolt threadedly extending into the respective clevis 43, 24 and adjustably secured thereto by a nut 45, 47, the first and second bolts 44, 46 are joined together at their heads by a shaft coupler 49. The upper position in which the punch 14 is fully retracted and the amount of force by which the first and second fastener elements A, B are to be compressed between the punch 14 and die 11, can be adjusted by varying the amount by which the first and second bolts 44, 46 threadedly extend into the respective clevises or connecting pieces 43, 24. The upper connecting piece 24 is pivotally connected to one end of the second link 23 which is pivotally mounted on the frame 7 by a pin 25 and the second link 23 is connected at the other end to the upper end of the plunger 20 via the first link 22.

The reciprocating motion of the piston rod 31 is thus transmitted to the plunger 20 via the compression spring 40, the auxiliary rod 41, the upper and lower connecting pieces 43, 24, and the first and second links 22, 23, during which time the compression spring 40 serves as a shock absorber to prevent the first and second fastener members A, B from being overcompressed between the punch 14 and die 11. To make this shock absorber inoperative, a bar or rod 48 (dash-and-two-dot lines in FIG. 3) is simply inserted through a horizontal hole 52 in the upper portion 41b of the piston rod 41.

The upper end of the stroke of the auxiliary rod 41 is determined by a contact projection 75 (FIG. 1) on the cap 51 and a limit switch 74 supported by the frame 7. When the limit switch 74 is actuated by the contact projection 75 as the auxiliary rod 41 is moved upwardly, the limit switch 74 produces a command signal to/cause the piston rod 31 to return to its lower or retracted position.

Figure 2:
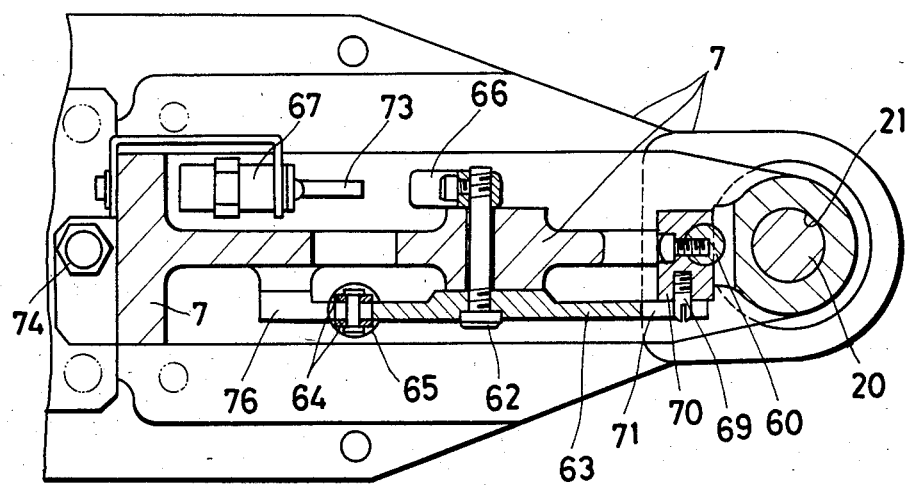
FIG. 2 is an enlarged cross-sectional view taken along line II—II of FIG. 1.
Figure 5:
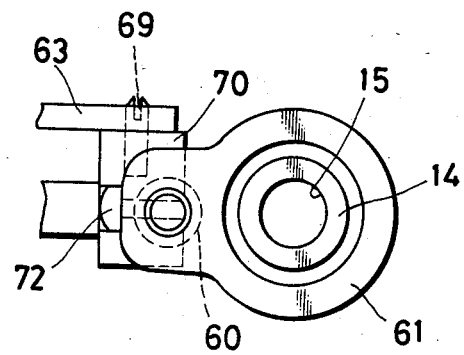
FIG. 5, appearing with FIG 2, is an enlarged bottom view of a punch unit as viewed along line V—V of FIG. 1.
Figure 4:
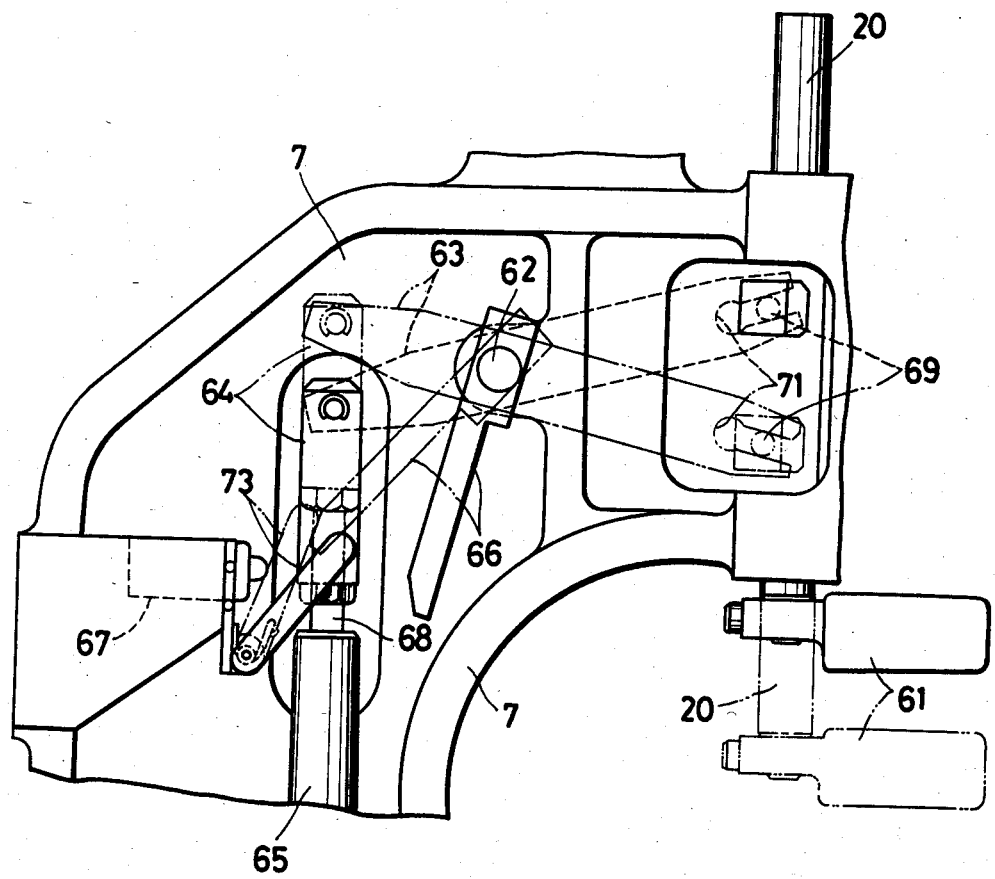
FIG. 4 is a schematic view illustrating the operation of a safety mechanism.

The apparatus has a safety mechanism 6 (FIGS. 1, 2, 4 and, 5) which includes a vertically movable supporting rod 60 supported by the frame 7 in parallel relation to the plunger 20, and a safe-confirmation member 61 secured to the lower end of the supporting rod 60 by a screw 72. The supporting rod is operatively connected to an air cylinder 65 via a lever 63.

The lever 63 is fixedly mounted on a pivot 62 rockably mounted on the frame 7. The lever 63 is pivotally connected at one end to a connecting piece 64 which is secured to a piston rod 68 of the air cylinder 65. The air cylinder 65 is pivotally mounted on a bracket 76 fixed to the frame 7. The lever 63 has in the other end a longitudinal slot 71, in which a horizontal pin 69, mounted on a block 70 fixed to the supporting rod 60, is slidably received.

The safe-confirmation member 61 in the form of a ring having an inside diameter larger than the outside diameter of each of the punch 14 and the die 11. In response to the vertical reciprocating movements of the air cylinder 65, the supporting rod 60 is vertically movable between an uppermost position (FIG. 1) in which the safe-confirmation member 61 is disposed around the punch 14 as retracted from the die 11, and a lowermost position (phantom lines in FIG. 4) in which the safe-confirmation member 61 is disposed around the die 11 in the absence of any obstacle, such as the operator's finger or a tool, near the die 11.

The air cylinder 65 is a small-sized so that the piston rod 68 can be overpowered and retracted by a finger. If inadvertently the operator's finger or a tool is present near the die 11, lowering of the safe-confirmation member 61 will cause it to engage the finger or tool and thus movement of the member 61 will be stopped short of the lowermost position and, after a lapse of a predetermined time, the safe-confirmation member 61 will be returned to its upper or retracted position and then will start to be lowered again, during which time the operator's finger or a tool may be removed.

An arm 66 is fixedly mounted on the pivot 62 and is pivotally movable, in response to the turning of the lever 63 and thus the pivot 62, between a first position (solid lines in FIG. 4) corresponding to the uppermost position of the safe-confirmation member 61, and a second position (phantom lines in FIG. 4) corresponding to the lowermost position of the safe-confirmation member 61. When the safe-confirmation member 61 is lowered to its lowermost position in the absence of any obstacle near the die 11, an actuator 73 of a switch 67 mounted on the frame 7 is engaged by the arm 66 as the latter is pivotally moved to the second position. As a result, the switch 67 produces a command signal to energize the air cylinder 30 to start lowering of the punch 14.

In operation, the first and second fastener elements A, B are placed on the punch 14 and the die 11, respectively, with the punch 14 in retracted position (FIG. 1). Upon actuation of the air cylinder 65, the supporting rod 60 with the safe-confirmation member 61 starts to move downwardly toward the die 11. When the safe-confirmation member 61 arrives at its lowermost position, in the absence of any obstruction by the operator's finger or a tool near the die 11, the arm 66 hits the actuator 73 of the switch 67 which then produces a command signal. Thus the presence of no obstacle around the die 11 has been confirmed, whereupon the air cylinder 30 is energized, in response to the command signal, to start lowering of the punch 14.

As the punch 14 is fully lowered to compress the first and second fastener members A, B against the die 11, the limit switch 74 is actuated by the contact projection 75 on the piston rod's cap 42 to issue a command signal for the air cylinder 30 to start returning of the punch 14 to its upper or retracted position.

In the apparatus thus constructed, because lowering of the punch 14 does not start until the absence of any obstacle around the die 11 has been confirmed, it is possible to assemble the first and second fastener members A, B together easily and correctly without any danger that the operator's finger or a tool would be jammed between the die 11 and the punch 14 during the assembling.

Although various minor modifications may be suggested by those versed in the art, it should be understood that I wish to embody within the scope of the patent warranted hereon, all such embodiments as reasonably and properly come within the scope of my contribution to the art.

What is claimed is:

1. An apparatus for assembling a pair of fastener elements of a garment fastener, comprising:
    (a) a frame;
    (b) a stationary die supported by said frame for supporting one of the fastener elements;

(c) a vertically movable plunger supported by said frame and carrying a punch in opposite relation to said die for supporting the other fastener element;
(d) first drive means for moving said plunger and thus said punch vertically toward and away from said die to join the two fastener elements together;
(e) a vertically movable supporting rod supported by said frame in parallel relation to said plunger;
(f) a safe-confirmation member mounted on a lower end of said supporting rod;
(g) second drive means for moving said supporting rod vertically between an uppermost position in which said safe-confirmation member is disposed around said punch as retracted from said die, and a lowermost position in which said safe-confirmation member is disposed around said die in the absence of any obstacle near the die, said second drive means including:
  (1) a pivot rockably mounted on said frame,
  (2) a lever fixed to said pivot and connected at one end to said supporting rod, and
  (3) a reciprocating drive operatively connected to the other end of said lever for turning the latter on said pivot through a predetermined angle; and
(h) means for detecting when said safe-confirmation member arrives at said lowermost position, said detecting means being operable, in response to said detection to produce a command signal to energize said first drive means.

2. An apparatus according to claim 1, said detecting means including an arm fixed to said pivot and pivotally movable, in response to the rocking of said lever and thus said pivot, between a first and a second position corresponding to said uppermost and lowermost positions, respectively, of said supporting rod, and a switch supported by said frame and having an actuator engageable by said arm when the latter is pivotally moved to said second position.

3. An apparatus according to claim 1, said supporting rod having a horizontal pin slidably received in a slot in said one end of said lever.

4. An apparatus according to claim 1, said reciprocating drive comprising an air cylinder.

* * * * *